United States Patent [19]

Yoshimura

[11] Patent Number: 4,694,151

[45] Date of Patent: Sep. 15, 1987

[54] AUTOFOCUSING ZOOM LENS SYSTEM WITH BEAM SPLITTER PRISM FOR SINGLE LENS REFLEX CAMERAS

[75] Inventor: Hirofumi Yoshimura, Nakano, Japan

[73] Assignee: Kabushiki Kaisha Cosina, Nakano, Japan

[21] Appl. No.: 745,777

[22] Filed: Jun. 17, 1985

[30] Foreign Application Priority Data

Jul. 6, 1984 [JP] Japan ............................ 59-102686[U]

[51] Int. Cl.[4] ................................................. G03B 3/10
[52] U.S. Cl. ..................................... 250/201; 350/429; 350/445; 354/402; 354/406
[58] Field of Search ................ 250/201, 204; 350/429, 350/445; 354/402, 404, 406, 407, 409; 358/227

[56] References Cited

U.S. PATENT DOCUMENTS

| | | | |
|---|---|---|---|
| 3,972,056 | 7/1976 | Tsujimoto et al. ................. | 354/402 |
| 4,185,191 | 1/1980 | Stauffer ............................. | 250/204 |
| 4,333,007 | 6/1982 | Langlais et al. .................... | 250/201 |
| 4,506,970 | 3/1985 | Fujibayashi ........................ | 354/406 |
| 4,529,286 | 7/1985 | Fujii ................................... | 354/402 |
| 4,609,944 | 9/1986 | Nakada et al. ..................... | 358/227 |

Primary Examiner—Edward P. Westin
Attorney, Agent, or Firm—Jordan and Hamburg

[57] ABSTRACT

An autofocusing zoom lens, comprising a half-mirror prism and a sensor capable of detecting light in conjunction with the half-mirror prism, is formed by inserting the half-mirror prism between the front-lens and rear-lens groups of the master-lens groups of the lens system. The insertion of the half-mirror prism has the advantages that the back focus may be shortened, the lens aperture need not be enlarged, and that the lens length in effect may be shortened. Additional use of a sensor-related lens makes autofocus available even when the angle of exit pupil of the imaging optical system is small.

5 Claims, 3 Drawing Figures

PRIOR ART

AUTOFOCUSING ZOOM LENS SYSTEM WITH BEAM SPLITTER PRISM FOR SINGLE LENS REFLEX CAMERAS

DESCRIPTION OF THE PRIOR ART

A conventional autofocusing zoom lens comprises a half-mirror prism and a sensor capable of detecting light in conjunction with the half-mirror prism.

FIG. 3 schematically illustrates the structure of an autofocusing zoom lens of the conventional type. Referring to FIG. 3, behind the backmost section of an imaging optical system 30 is provided a half-mirror prism 31. A transmitted light $L_1$ through this half-mirror prism 31 gives an optical image on a film 32. Light $L_2$ from the half-mirror prism controls the TTL autofocusing function in such a way that the reflected light $L_2$ is subject to an optical detection by an autofocusing sensor 33 provided beneath the prism and that this optical detection causes a focus lens in the imaging optical system 30 to shift back and forth.

The sensor 33 is a line sensor with a light-receiving element composed of a plurality of pairs of CCD, etc. For light incident on the light-receiving element, the displacements (phase differences) of the signals received at each of the pairs are detected and then the focal displacements are computed. Here, no further description of the principle of autofocusing is made since the related details are described, for example, in U.S. Pat. No. 4,333,007, Langlais et al, and U.S. Pat. No. 4,185,191, N. L. Stauffer, for through the camera lens (TCL) systems.

The conventional autofocusing zoom lens poses problems as follows: Referring to FIG. 3, the imaging optical system 30 has a practical back focus $S_1$, which is not the real dimension but an optical length. The back focus from the back face of the half-mirror prism 31 is denoted by $S_2$, which is required to be at least ca. 40 mm for usual 35-mm single-lens reflex cameras. Assume that the front-to-back thickness and refractive index of the half-mirror prism 31 are d and n, respectively. If the prism 31 is set behind the imaging optical system 30, the back focus $S_1$ must be at least $S_2 + nd$. Fulfillment of this requirement by means of interchangeable lenses necessitates an increase in the aperture of the lens for the imaging optical system 30 and further an increase in size of the interchangeable lens itself.

The optical system up to the film 32 should necessarily become equivalent to the one up to the autofocusing sensor 33. The autofocusing system of this type, in which an image formed on the autofocusing sensor 33 is subject to detection with respect to its optical phase difference, requires the angle of exit pupil of its optical system to be larger than a certain constant value so that the autofocusing sensor 33 may have effective images. Thus, under the condition that the optical system up to the film 32 and the one up to the autofocusing sensor 33 should be the same, there is a problem that a restriction is inevitably imposed on the design of the lens for the imaging optical system 30 since, as described above, the angle of exit pupil of the autofocusing sensor 33 should be larger than a certain constant value.

Conversely, when the angle of exit pupil of the imaging optical system 30 is too large for the autofocusing sensor 33, another problem is raised that some condition on focal depth prevents the precision of autofocus from being raised to the minimum required level.

SUMMARY OF THE INVENTION

The object of the present invention is to provide an autofocusing zoom lens which allows the half-mirror prism to be incorporated without enlarging the lens aperture, the lens design to be made not only freely, but also properly, and a lens reduction in dimension to be realized.

SPECIFICATION OF THE INVENTION

Preferred embodiments of the present invention will be concretely explained below by reference to the accompanying drawings.

The 1st embodiment

Figure 1:
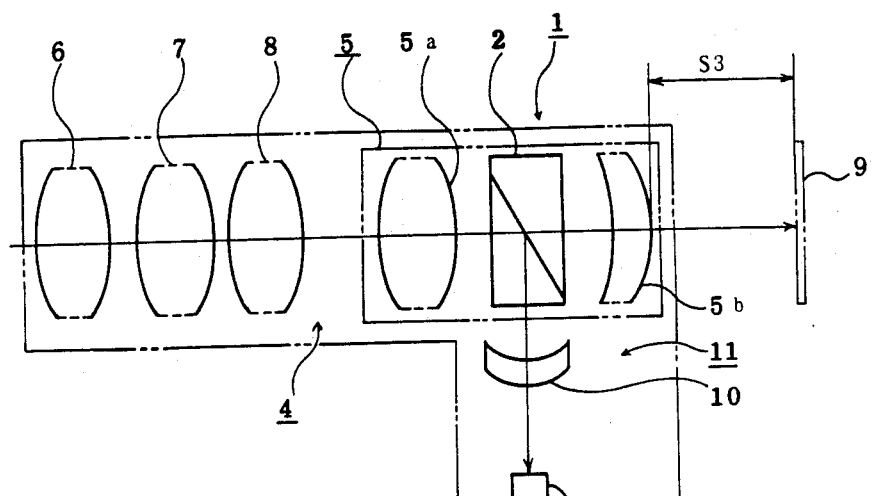
FIG. 1 schematically illustrates an autofocusing zoom lens relating to the 1st embodiment of the present invention.

FIG. 1 schematically illustrates the structure of an autofocusing zoom lens for the 1st embodiment of the present invention.

An imaging optical system 4 in a zoom lens 1 is provided with a focus-lens group 6 at the foremost section. Behind the lens group 6 there is provided a variator-lens group 7 followed by a compensator-lens group 8. Behind this compensator-lens group 8 there is provided a master-lens group 5 which allows the optical image of an object to condense on a film 9 within a camera body. The variator-lens group 7 serves to adjust the image ratio under the condition that both the imaging optical system and the optical system for the autofocusing sensor (to be described later) should be kept in a prescribed constant functional (proportional) relation to each other. The compensator-lens group 8 is for adjusting the optical system and in general travels in cam connection with the variator-lens group 7.

The master-lens group 5 comprises a front-lens group 5a and a rear-lens group 5b. Between the front-lens group 5a and the rear-lens group 5b there is provided a half-mirror prism 2 in accordance with the present invention. As to the number of lenses constituting the master-lens group 5, for example, the telezoom lens uses a front-lens group 5a composed of 2 to 4 lenses and the rear-lens group 5b composed of 2 or 3 lenses.

Beneath the prism 2 there is provided a sensor-related lens 10, below which there is provided an autofocusing sensor 3 capable of photoelectric conversion. The front-lens group 5a, the half-mirror prism 2, and the sensor-related lens 10 comprise a master-lens group 11. Part of an incident light penetrating the front-lens group 5a is caused to reflect downward by the half-mirror prism within the prism 2, reaching the sensor 3 through the sensor-related lens 10.

The lenses 6, 7, 8, and 5a, the half-mirror prism 2, and the lens 10 comprise an autofocusing-sensor optical system 12.

The above-described system brings autofocusing into effect as follows: Usually, there will be some positional deviation between the film 9 and the object image which the imaging optical system 4 forms at an arbitrary moment according to the distance to the object, the focal length of the imaging optical system 4, the positions of front and back focuses of the imaging optical system 4, etc. The sensor 3 will detect this positional deviation and adjust the image position to the face of the film 9 by shifting forward or backward a part of the lens system 4, e.g., the focus-lens group 6. During this shift of the focus-lens group 6, the imaging optical system 4 and the sensor optical system 12 maintains some given functional relation to each other. When each of the master-lens groups 5 and 11 constitutes an equivalent optical system, each system will have, an optically equivalent image shift.

The division of the master-lens group 5 into two, the front and rear groups, and the insertion of the half-mirror prism 2 between these two groups allow the back focus $S_3$ from the rear face of the rear-lens group 5b to the face of film 6 to be significantly shortened and avoid enlarging of the lens aperture of the imaging optical system 4. The latter effect in turn allows the lenses to be made thinner. Thus, the miniaturization of lens is made possible and, when a number of lenses are used on a camera, great reduction in production cost is effected. Furthermore, the reduction in thickness of lens is effective for shortening the overall lens length.

The half-mirror prism 2 with a refractive index $n > 1$ is placed between the front-lens group 5a and the rear-lens group 5b of the master-lens group 5. Therefore, the actual length between the front-lens group 5a and the rear-lens group 5b is made longer by $(n-1)d/n$ than in the absence of the half-mirror prism 2, but the overall lens length is made shorter by more than $d/n$ than with the half-mirror prism placed behind all the lenses as in the conventional system.

The insertion of the half-mirror prism 2 may easily be made with a telezoom lens which in general has a wide interval between the lens groups 5a and 5b.

The sensor-related lens 10 may be selected from among a number of lenses with different focal lengths according to purposes.

For example, when the focal length of the sensor-related lens 10 has been selected so that the focal length of the autofocusing-sensor optical system 12 is longer than that of the imaging optical system 4, higher precision of autofocus may be obtained since the shift of image at the sensor 3 is more than that at film 9.

On the other hand, when the focal length of the sensor-related lens 10 has been selected so that the focal length of the autofocusing-sensor optical system 12 is shorter than that of the imaging optical system 4, both the angle of exit pupil and the plane illuminance of the sensor 3 can be made larger since the aperture ratio of the sensor optical system 12 is smaller (clearer) than that of the imaging optical system 4.

Especially, when the aperture ratio of the imaging optical system 4 is large and its angle of exit pupil is small, and when the angle of exit pupil required on the sensor 3 is larger than that of the imaging optical system 4, selection of the latter condition makes autofocus available.

The 2nd Embodiment

Figure 2:
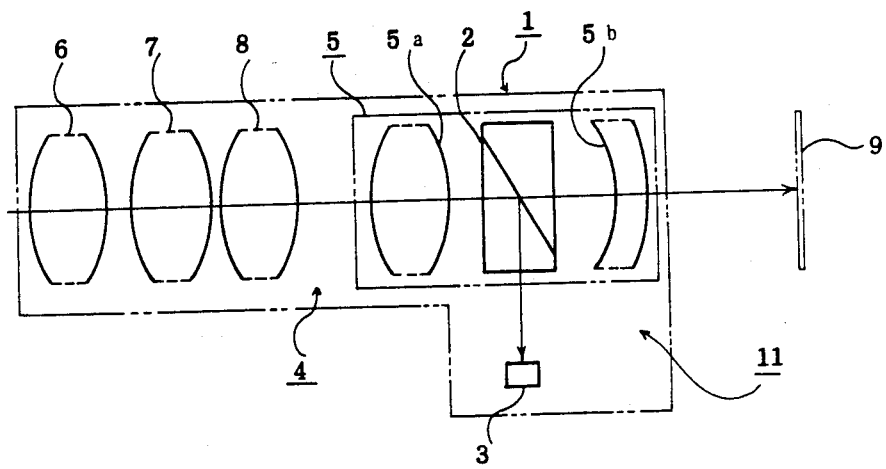
FIG. 2 schematically illustrates an autofocusing zoom lens relating to the 2nd embodiment of the present invention.
Figure 3:
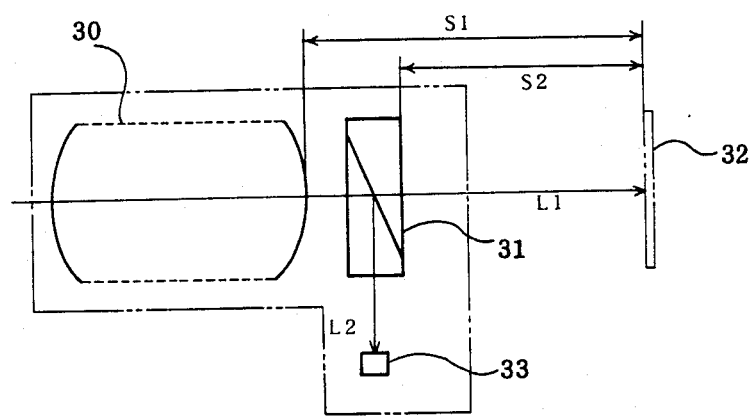
FIG. 3 schematically illustrates an autofocusing zoom lens relating to the conventional system structure.

Next, the 2nd embodiment is described. FIG. 2 schematically illustrates an autofocusing zoom lens relating to the 2nd embodiment of the present invention. For facilitating the understand of the structures, the same reference number denotes the same component for both FIGS. 1 and 2.

The difference of the 2nd embodiment from the 1st is that the sensor-related lens 10 used in the 1st is excluded. Without the lens 10, for example, the system may effectively be constructed by making the rear lens group 5b a concave lens system as shown in FIG. 2 and the aberration correction may be achieved by selecting both the focal length and lens structure of the front-lens group 5a and the position, thickness, and height (especially the downward length from the center) of the prism 2.

The exclusion of the lens 10 not only allows the number of lenses used to be reduced but also makes it possible, with a concave lens used for the rear-lens group 5b, that the master-lens group 5 for the sensor 3 is clearer than the master-lens group for the film; the latter result comes from the fact that the focal length of the master lens for the sensor 3 depends on the front-lens group 5a.

As described above, the present invention relates to autofocusing zoom lenses comprising a half-mirror prism and a sensor detecting light in conjunction with this prism, and imposes a condition that the above half-mirror prism should be inserted in the master-lens group of the lens system. The setting of this condition leads to the effect that the back focus may be made considerably short, so that we may have an autofocusing zoom lens of small size and light weight without enlarging the lens aperture; the overall lens length may be in effect be reduced by more than nd as described already.

Since, as described above, the overall lens length may be reduced without enlarging the lens aperture, for example, the focusing and zooming mechanisms may be constructed with reduced size and cost.

With the conventional structure, in some cases the angle of exit pupil of the imaging optical system is too small for the angle of exit pupil required for the sensor to be obtained and thus we may have no effective autofocus. Even in such cases, the present invention makes autofocus available with the sensor-related lens suitably selected.

What is claimed is:

1. In an autofocusing zoom lens system for a single lens reflex camera having a beam splitter prism and comprising a focusing lens group adapted to be driven back and forth freely, a variator lens group for zooming located behind said focusing lens group, a compensator lens group located behind said variator lens group, a master lens group fixed behind said compensator lens group, said master lens group allowing the optical image of an object to form on a film in the body of the camera, a beam splitter prism, and a sensor positioned to detect image displacement formed by a beam reflected at said beam splitter prism for driving said focusing lens group to recover image displacement for autofocusing, the improvement wherein said master lens group includes a fixed front lens group and a fixed rear lens group, and said beam splitter prism is inserted between said fixed front lens group and said fixed rear lens group.

2. The autofocusing zoom lens system of claim 1, wherein said fixed front lens group is a positive lens system, and said fixed rear lens group is a negative or positive lens system.

3. In an autofocusing zoom lens system for a single lens reflex camera having a beam splitter prism for focusing and comprising a focusing lens group adapted to be freely driven back and forth, a variator lens group for zooming located behind said focusing lens group, a compensator lens group located behind said variator lens group, a master lens group fixed behind said compensator lens group said master lens group allowing the optical image of an object to form on a film in the body of the camera, a beam splitter prism, and a sensor positioned to detect image displacement formed by a beam reflected at said beam splitter prism for driving said focusing lens group to recover image displacement for autofocusing, the improvement wherein said master lens group includes a fixed front lens group and a fixed rear lens group, said beam splitter prism being inserted between said fixed from lens group and said fixed rear lens group, and a lens for sensor positioned between said prism and said sensor; said fixed front lens group, beam splitter prism and said lens for sensor comprising a master lens system for said sensor.

4. The autofocusing zoom lens system of claim 3, wherein the focal length of the lens for the sensor is adjusted in order that focal length of picture taking optical system for autofocusing including said focusing lens group, said variator lens group, said fixed front lens group, said beam splitter prism and said lens for sensor is equal to or longer than focal length of optical system including said focusing lens group, said variator lens group, said fixed front lens group, said beam splitter prism and said fixed rear lens group.

5. The autofocusing zoom lens system of claim 3, wherein the focal length of the lens for the sensor is adjusted in order that focal length of picture taking optical system for autofocusing including said focusing lens group, said variator lens group, said fixed front lens group, said beam splitter prism and said lens for the sensor is shorter than focal length of optical system including said focusing lens group, said variator lens group, said fixed front lens group, said beam splitter prism and said fixed rear lens group.

* * * * *